United States Patent [19]

Allen et al.

[11] Patent Number: 4,936,701
[45] Date of Patent: Jun. 26, 1990

[54] UNIVERSAL JOINT WITH ROTATING HOLDER SLEEVE

[75] Inventors: Kenneth D. Allen, Spring Valley; James S. Amtmann, Dublin, both of Ohio

[73] Assignee: Mac Tools, Inc., Washington Court House, Ohio

[21] Appl. No.: 400,320

[22] Filed: Aug. 30, 1989

[51] Int. Cl.5 ............................................. F16D 3/10
[52] U.S. Cl. .................................. 403/57; 403/114; 403/120; 403/146; 403/322; 403/324; 81/177.75; 464/115; 464/120
[58] Field of Search ............... 403/161, 113, 114, 120, 403/146, 165, 324, 362, 57, 12, 34, 322, 328; 81/177.75, 177.7, 177.85; 464/122, 123, 115, 141, 120

[56] References Cited

U.S. PATENT DOCUMENTS

| | | | |
|---|---|---|---|
| 1,584,208 | 5/1926 | Bellows | 81/73 |
| 2,526,105 | 10/1950 | Adams | 81/177.75 X |
| 2,664,002 | 12/1953 | Anderson | 464/112 |
| 2,722,812 | 11/1955 | Golasky | 464/112 |
| 3,290,739 | 12/1966 | Harley | 403/349 X |
| 3,802,302 | 4/1974 | Bengtson | 81/177.75 X |
| 4,026,605 | 5/1977 | Emmerich | 403/328 X |
| 4,065,941 | 1/1978 | Aoki | 464/115 |
| 4,114,401 | 8/1978 | Van Hoose | 464/120 |
| 4,615,191 | 10/1986 | Grandy | 403/328 X |
| 4,637,751 | 1/1987 | Vollmer | 403/11 X |
| 4,825,732 | 5/1989 | Arnold | 81/121.1 |

FOREIGN PATENT DOCUMENTS

| | | | |
|---|---|---|---|
| 2651168 | 5/1978 | Fed. Rep. of Germany | 81/177.75 |
| 2745384 | 5/1979 | Fed. Rep. of Germany | 81/177.75 |

OTHER PUBLICATIONS

Mac Tools, Inc., product catalog; anniversary edition; issued Oct. 1987; pp. 63 & 73.

*Primary Examiner*—Andrew V. Kundrat
*Assistant Examiner*—Franco S. Deliguori
*Attorney, Agent, or Firm*—Biebel, French & Nauman

[57] ABSTRACT

A universal joint for use with impact wrenches and the like comprising a coupling having a bore at one end for engaging the drive shaft of a wrench and a ball receiving cavity at its other end; a socket engaging part having a ball member disposed in the ball receiving cavity; and a guide sleeve concentrically and slidably mounted for free rotation to the coupling, the guide sleeve having a substantially smooth uninterrupted outer cylindrical surface which may be held between the fingers of an operator while the joint is rotating.

7 Claims, 1 Drawing Sheet

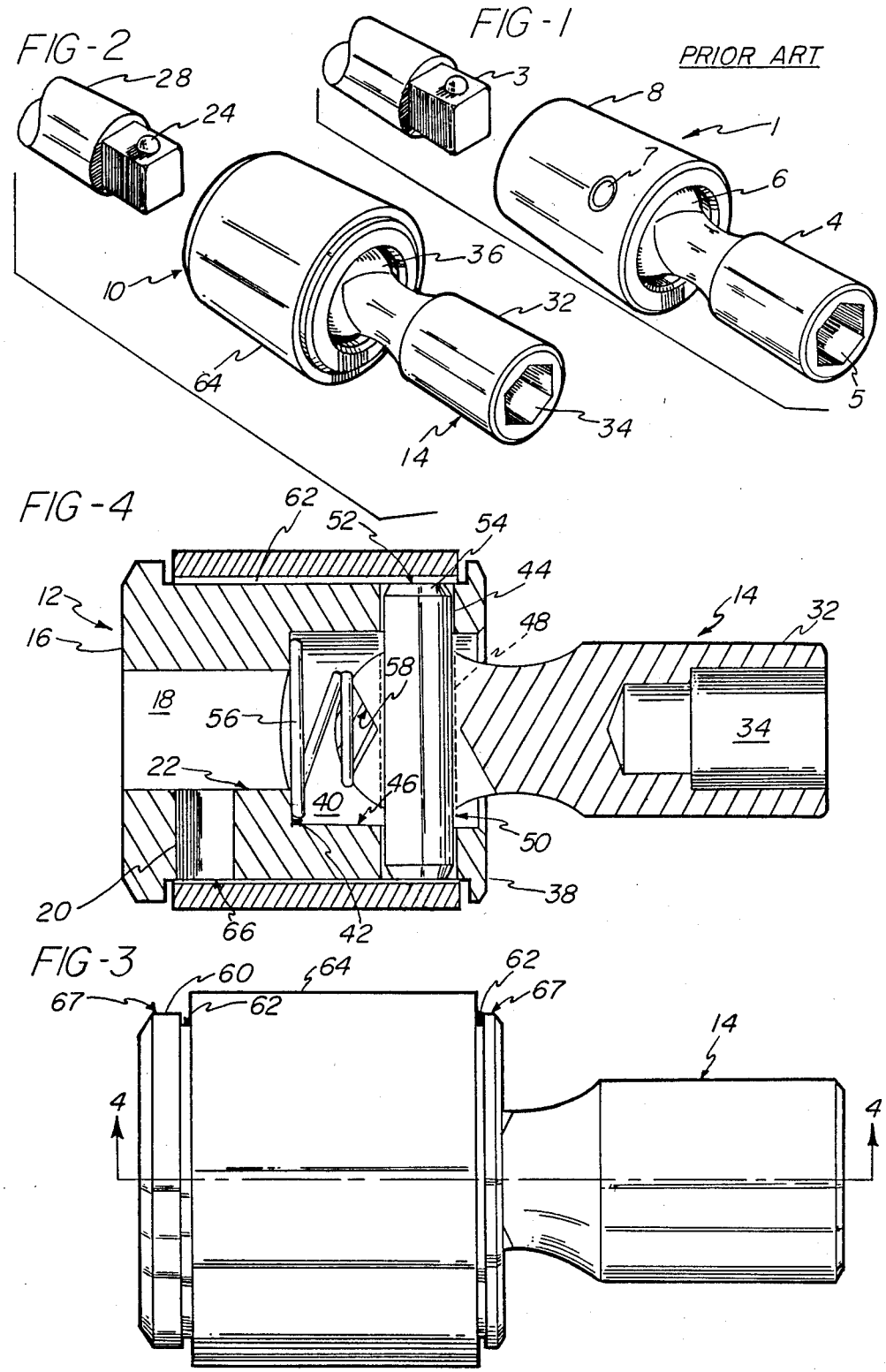

UNIVERSAL JOINT WITH ROTATING HOLDER SLEEVE

BACKGROUND OF THE INVENTION

The present invention relates to universal joints for transmission of torque from a tool, and particularly for use in combination with an impact wrench.

The use of universal joints to tighten or loosen nuts or bolts by repeated blows rapidly applied by a rotary impacting means is well known in the art.

Prior art universal joints, such as shown in FIG. 1, typically comprise a coupling 1 having a bore (not shown) for engaging the shaft 3 of an impact wrench and a socket part 4 having an appropriately shaped socket 5 for engaging a nut or head of a bolt. The coupling 1 includes a cavity for engaging a ball member 6 disposed at one end of the socket part 4, and a cross pin 7 extending diametrically through the ball member 6 and the casement 8 of the coupling 1 to retain the ball member 6 in the cavity and to provide the torque transmitting connection between the coupling 1 and the socket part 4. The ends of the pin 7 are upset to lock the pin in the ball member 6 and the coupling 1.

In conventional prior art universal joints, as these parts wear the upset end of the pin may break away or fracture. The pin may fall out, or at least emerge partially from the coupling so as to weaken the torque transmitting connection to the socket part.

Consequently, a need exist for a universal joint having a substantially smooth uninterrupted rotating sleeve which can be used by the operator to guide the joint and will function to maintain the torque transmitting connection from the tool to the socket part.

SUMMARY OF THE INVENTION

The present invention provides a universal joint for use with impact wrenches and the like. The universal joint comprises a coupling having a bore at one end for engaging the drive shaft of a wrench and a ball receiving cavity at its other end; a socket part having a ball member disposed in the ball receiving cavity and connected to the coupling by a cross pin; and a guide sleeve concentrically and slidably mounted for free rotation to the coupling so as to cover the ends of the pin and retain it in place, the guide sleeve having a substantially smooth uninterrupted outer cylindrical surface which may be held between fingers of an operator while the joint is rotating to hold the sleeve stationary and guide the joint in its operation.

The primary object of this invention, is to provide a universal joint for a rotary tool output having a generally smooth uninterrupted outer sleeve which can be used by an operator to guide the universal joint and which covers and retains a connecting cross pin within the joint.

Other objects and advantages of the invention will be apparent from the following description, the accompanying drawings, and the appended claims.

BRIEF DESCRIPTION OF THE DRAWING

FIG. 1 is a perspective view of a prior art universal joint;

FIG. 2 is a perspective view of a universal joint of the present invention;

FIG. 3 is a side elevation view showing the coupling sleeve and the socket engaging sleeve of the universal joint; and FIG. 4 is a cross-sectional view of the universal joint taken along section lines 4-4 of FIG. 3.

DETAILED DESCRIPTION OF THE PREFERRED EMBODIMENT

Referring to the drawings, a universal joint, generally designated 10, is shown in FIGS. 1 through 3, comprising a generally cylindrical impact coupling 12 and a socket part 14. The coupling 12 includes a first end 16 having an inwardly extending generally rectangular bore 18 and a generally cylindrical opening 20 extending radially through the wall 22 of the coupling 12 for receiving a conventional ball detent 24 carried on the drive shaft 28 of an impact wrench. The socket part 14 includes a shaft portion 32 having an appropriate socket 34 extending inwardly from one end for engaging a nut or head of a bolt and a generally spherical shaped ball member 36 extending from the other end thereof.

The coupling 12 further includes a second end 38 having a generally cylindrical ball receiving cavity 40 communicating with the rectangular bore 18 and defining a ledge 42 therewith. The cylindrical ball receiving cavity 40 extends inwardly from the second end 38 for engaging the ball member 36 of the socket part 14 and includes diametrically opposed openings 44 extending through the wall 46 of the coupling 12.

The ball member 36 is adapted to fit for rotation within the cavity 40 and includes a transverse slot 48 facing respective openings 44 in the coupling 12. A pin 50 extends diametrically through slot 48 in the ball member 36 and through openings 44 to retain the ball member 36 in the ball receiving cavity 40 and to provide the torque transmitting connection between the coupling 12 and the socket part 14. The ends 52 of the pin 50 have convex surfaces 54 so during operation of the joint 10 they do not deform the interior of a guide sleeve 64 as they rotate inside the sleeve.

Extending outwardly from the ledge 42 is a coil spring 56 for abutting the ledge 42 and the inner end 58 of the ball member 36 to keep the pin 50 in contact with the ball slot 48 and the openings 44. The friction of these parts together with the spring pressure will keep the socket part 14 in place at whatever alignment it is arranged by an operator. This helps to align the socket 34 with the head of a fastener to be driven.

The outer circumferential surface 60 of the coupling 12 includes an undercut surface 62 across openings 44 and ends 52 of pin 50 and lengthwise across the outer circumferential surface 60 of the coupling 12. The rotating guide sleeve 64 is slightly shorter than the length of the undercut surface 62 having an inner diameter 63 approximately 3% to 5% less than the outer diameter of ends 67 of coupling 12. The guide sleeve 64 is fitted around the coupling 12, and is slightly shorter than the undercut surface 62 (see FIG. 4) and provides a smooth uninterrupted outer grip covering ends 52 of the pin 50 to retain the pin 50 in place, and preferably also to cover the outer end 66 of the cylindrical opening 20, while allow the parts within it to rotate. The guide sleeve 64 may be injection molded from a urethane plastic, and has an elastic limit which will accommodate the small enlargement necessary to fit the sleeve over one end of coupling 12 and onto the undercut surface 62.

It should be clear to one skilled in the art that the guide sleeve 64 provides a smooth uninterrupted outer grip which can be held stationary by the operator to guide and steady the universal joint 10.

While the form of apparatus herein described constitutes preferred embodiments of this invention, it is to be understood that the invention is not limited to this precise form of apparatus, and that changes may be made therein without departing from the scope of the invention which is defined in the appended claims.

What is claimed is:

1. A universal joint for use with wrenches and the like, the universal joint comprising:
   a coupling having a bore at one end for engaging the drive shaft of a wrench and a ball receiving cavity at its other end;
   a socket part having a ball member disposed in said ball receiving cavity;
   drive means for connecting said coupling to said socket part; and
   a guide sleeve concentrically and slidably mounted on said coupling for free rotation with respect to said coupling and said drive means, said guide sleeve having a smooth uninterrupted outer cylindrical surface which may be held between fingers of an operator as the joint is rotated.

2. A universal joint for use with impact wrenches and the like, the universal joint comprising:
   a coupling having a bore at one end for engaging the drive shaft of a wrench and a ball receiving cavity at its other end, said coupling including an outer surface having an undercut portion therein;
   a socket part having a ball member disposed in said ball receiving cavity;
   drive means for connecting said coupling to said socket part; and
   a guide sleeve mounted in said undercut portion for free rotation with respect to said coupling, said guide sleeve having a smooth uninterrupted outer cylindrical surface which may be held between fingers of an operator as the joint is rotated.

3. The universal joint as defined in claim 2, wherein said coupling includes diametrically opposed openings and said ball member includes a slot therethrough, and said drive means includes a pin extending through said openings in said coupling and through said slot in said ball member for retaining said ball member in said ball receiving cavity.

4. The universal joint as defined in claim 2, wherein said coupling includes diametrically opposed openings and said drive means includes a pin extending through said openings in said coupling and cooperating with said socket part to provide a torque transmitting connection between said coupling and said socket part.

5. The universal joint as defined in claim 4, including spring means acting between said coupling and said socket part to keep said pin in contact therewith to facilitate attachment of the socket part to the fastener.

6. A universal joint for use with wrenches and the like, the universal joint comprising:
   a coupling having a cylindrical outer surface and a bore at one for engaging the drive shaft of a wrench, a ball receiving cavity at its other end and diametrically opposed openings through said other end of diametrically opposed openings through said other end of said coupling, and an opening extending through said coupling for engaging a detent on the drive shaft to secure the shaft in said bore, said coupling including an outer surface having an undercut portion therein, said undercut portion extending lengthwise thereof across a portion of said outer surface;
   a socket part having a ball member disposed in said ball receiving cavity, said ball member having a slot therethrough;
   a pin extending through said diametrically opposed openings in said coupling and through said slot in said ball member for retaining said ball member in said ball receiving cavity and for transmitting torque; and
   a guide sleeve mounted in said undercut portion for free rotation with respect to said coupling and confined against longitudinal movement in said undercut portion, said guide sleeve having a smooth uninterrupted outer cylindrical surface which may be contacted by fingers of an operator as the joint is rotated.

7. The universal joint as defined in claim 6, wherein said coupling includes spring means journaled between said ball member and said drive shaft of a wrench to maintain said ball member in a stationary position relative to said drive shaft such that attachment of said socket part to a fastener is facilitated.

* * * * *

UNITED STATES PATENT AND TRADEMARK OFFICE
CERTIFICATE OF CORRECTION

PATENT NO. : 4,936,701
DATED : June 26, 1990
INVENTOR(S) : Allen et al

It is certified that error appears in the above-identified patent and that said Letters Patent is hereby corrected as shown below:

Column 4, line 10, "the", second occurrence should be --a--.

Column 4, line 14, after the word "one and before "for" insert --end--.

Signed and Sealed this

Twenty-seventh Day of August, 1991

Attest:

HARRY F. MANBECK, JR.

*Attesting Officer*  *Commissioner of Patents and Trademarks*